C. W. FULTON.
MOUNTING OR SUSPENSION OF VEHICLE BODIES.
APPLICATION FILED OCT. 12, 1906.
944,426.
Patented Dec. 28, 1909.
4 SHEETS—SHEET 1.
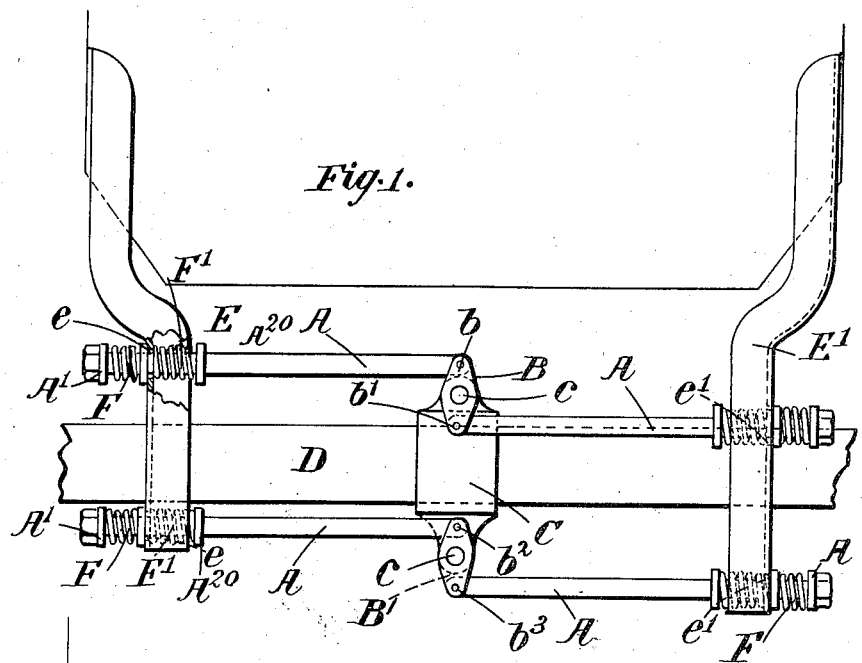
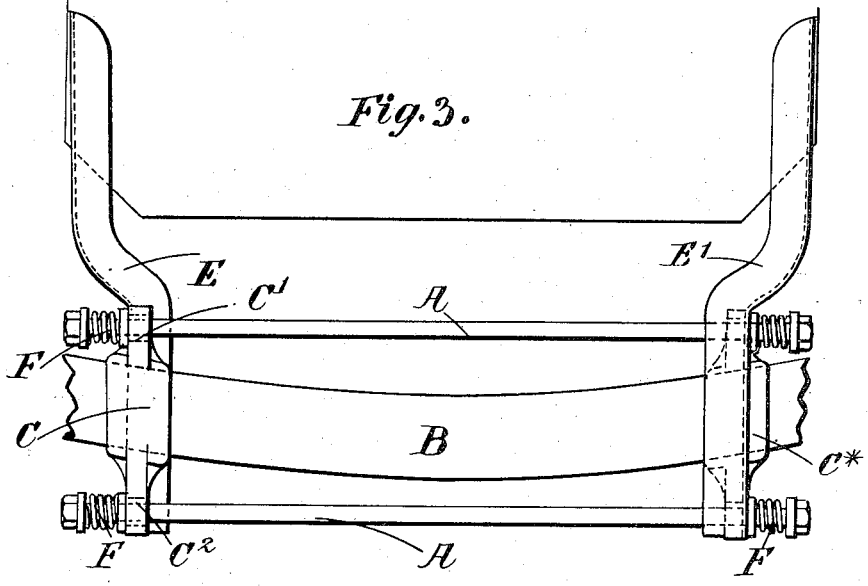

C. W. FULTON.
MOUNTING OR SUSPENSION OF VEHICLE BODIES.
APPLICATION FILED OCT. 12, 1906.
944,426.
Patented Dec. 28, 1909.
4 SHEETS—SHEET 2.
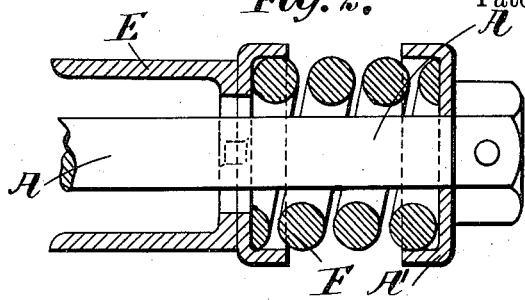
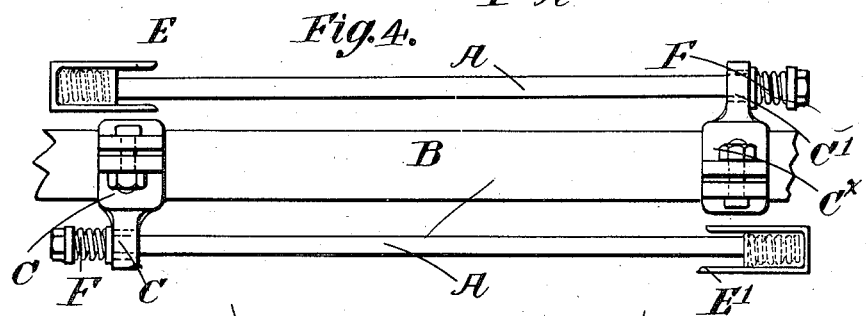
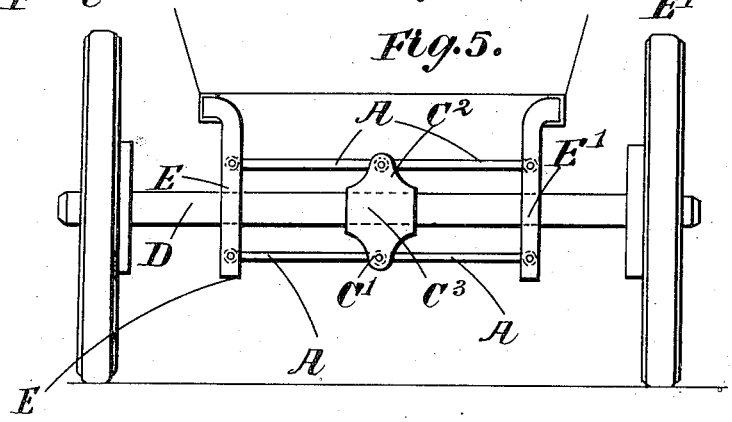
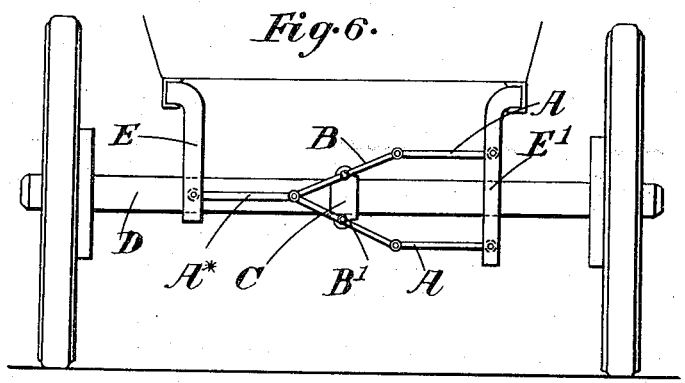
Witnesses
B. C. Rust
J. J. McCarthy
Inventor
Charles William Fulton
by Foster Freeman & Watson
Attorneys C. W. FULTON.
MOUNTING OR SUSPENSION OF VEHICLE BODIES.
APPLICATION FILED OCT. 12, 1906.
944,426.
Patented Dec. 28, 1909.
4 SHEETS—SHEET 3.
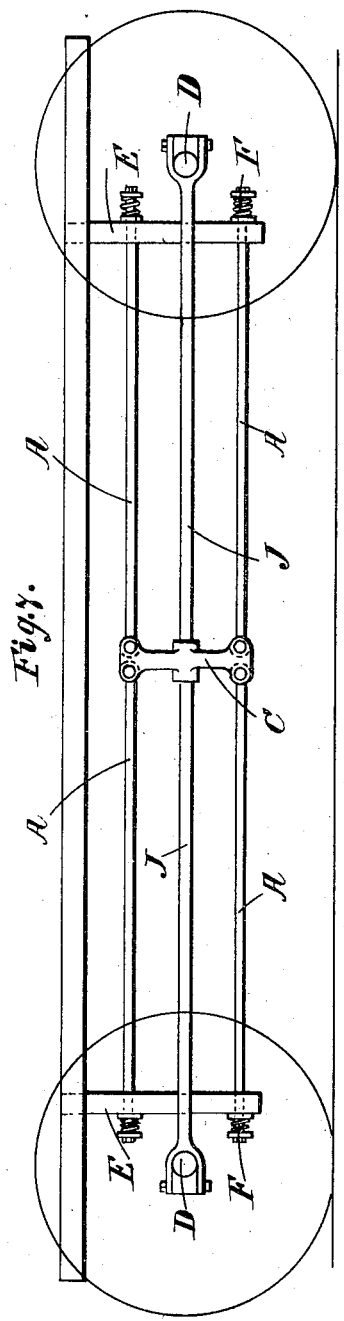
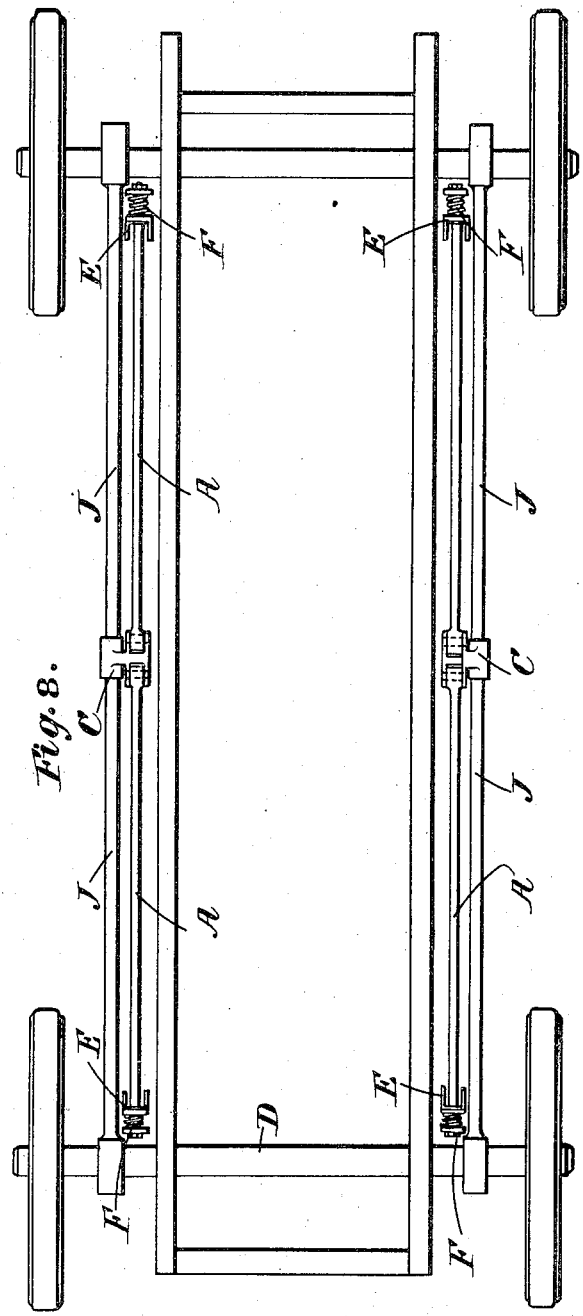

C. W. FULTON.
MOUNTING OR SUSPENSION OF VEHICLE BODIES.
APPLICATION FILED OCT. 12, 1906.
944,426.
Patented Dec. 28, 1909.
4 SHEETS—SHEET 4.
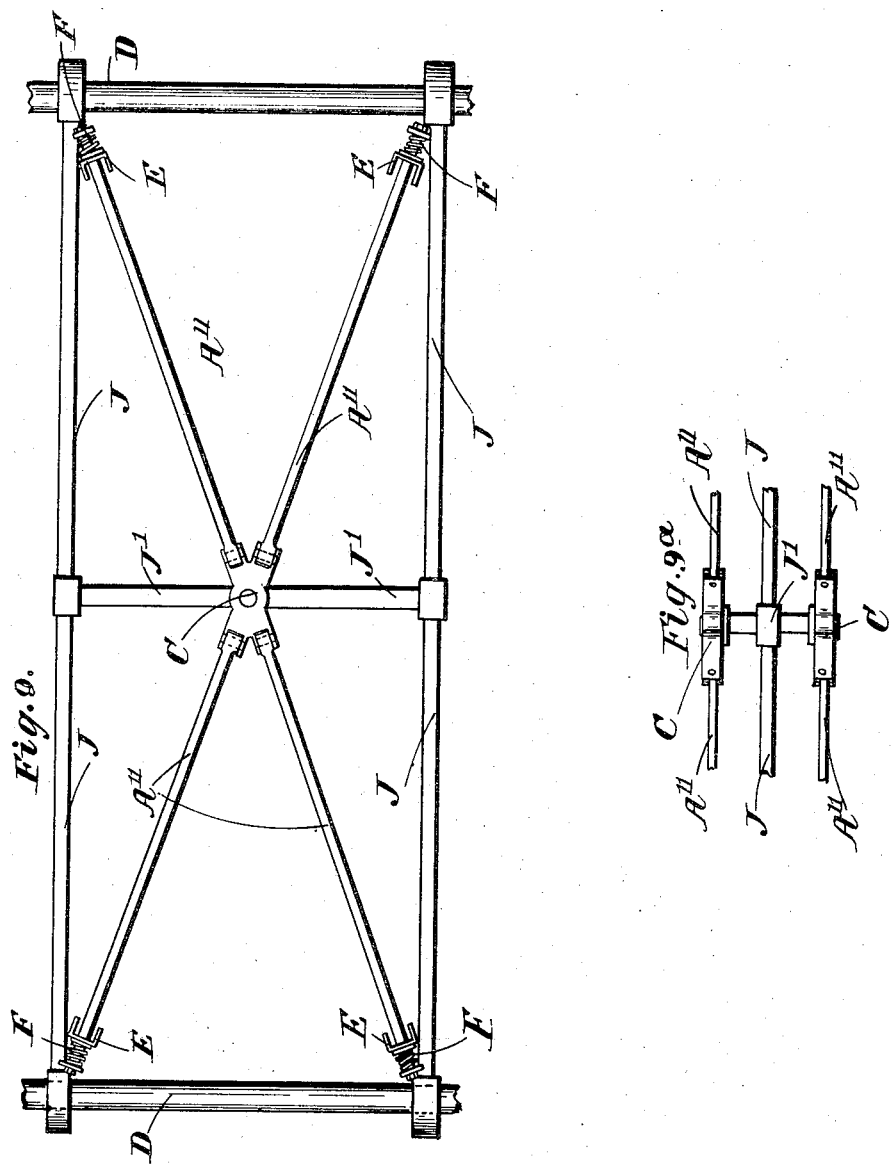

UNITED STATES PATENT OFFICE.

CHARLES WM. FULTON, OF PAISLEY, SCOTLAND.

MOUNTING OR SUSPENSION OF VEHICLE-BODIES.

944,426.  Specification of Letters Patent.  Patented Dec. 28, 1909.

Application filed October 12, 1906. Serial No. 338,683.

*To all whom it may concern:*

Be it known that I, CHARLES WILLIAM FULTON, a subject of the King of Great Britain, residing at The Glen, Paisley, Scotland, dyer and finisher, have invented certain new and useful Improvements in or Relating to the Mounting or Suspension of Vehicle-Bodies, of which the following is a specification.

This invention relates to the mounting or suspension of vehicle bodies and is particularly applicable to motor vehicles.

The chief object of the present invention is to prevent the body of the vehicle from tilting or canting sidewise relatively to the plane of the wheel-axles or to reduce to a minimum any tendency the body has to so act whether such tendency arises from, momentum in turning a corner, unequal loading, the camber of the road surface, or from any other cause. It is also within the scope of the present invention to provide for the prevention of the tilting of the body longitudinally. This system of mounting or connecting the vehicle body and the wheel-axles while preventing tilting or canting of the body gives flexibility in a vertical direction so as to permit all necessary relative vertical motion between the body relatively and the axles under the influence of the usual springs.

For the purpose of this invention there are provided; in order to prevent the vehicle body tilting or canting transversely relatively to the wheel axles, two or more rods or pairs of rods arranged transversely of the vehicle and each linked, or pivotally, or similarly connected at their opposite ends to the vehicle body and to the wheel axle respectively or members carried thereby. A similar arrangement of rods arranged longitudinally of the vehicle can be provided to prevent the body of the vehicle tilting longitudinally in which case one end of each rod in place of being attached to a wheel axle will be connected to a longitudinal member attached to the axles. The points of connection between these rods and the wheel axle on the one hand and between the frame of the vehicle and the rods on the other hand are so arranged that any tilting of the body relatively to the wheel axles is prevented or minimized and all necessary motion of the vehicle body in a vertical direction is permitted. The invention contemplates systems of mounting wherein one or more of the rods are in compression while another or others is or are in tension, or systems wherein all the rods are in tension or compression simultaneously.

While preventing canting or tilting as above stated this system allows of an angle being taken momentarily between the wheel axle and the vehicle when for example one wheel passes over an obstruction on the road which would not give time to convey the canting forces to the vehicle body.

Tilting or canting of the vehicle body both transversely and longitudinally can also be prevented by combining both of the above arrangements. In this case the rods, of which there are preferably four pairs, extend diagonally from each corner of the vehicle body to a central bracket or brackets or struts carried by a frame supported upon the wheel axles.

The present invention also contemplates in combination with the above stated features, the preventing of relative movement between the body and the wheel axles longitudinally of the latter.

Referring to the drawings:—Figure 1 is an elevation illustrating a preferred arrangement for preventing sidewise or transverse canting or tilting. Fig. 2 is a sectional view of a preferred form of frictionless joint between the ends of the rods and the brackets. Figs. 3 and 4 are respectively an elevation and a plan of a modified arrangement for preventing canting sidewise. Figs. 5, and 6 are elevations of further modifications. Figs. 7 and 8 are respectively an elevation and a plan of a convenient arrangement for preventing tilting or canting longitudially and Fig. 9 is a plan and Fig. 9ª a part elevation of an arrangement for preventing both transverse and longitudinal canting.

Referring first of all to Fig. 1, four rods A disposed transversely of the vehicle are employed and are arranged parallel with one another. The two upper rods are pivotally connected to the opposite ends $b$ $b'$ of a link or lever B which is pivoted at $c$ to a bracket C carried by a cross axle D midway between its ends. The opposite end of one of the upper pair of rods A is pivotally connected to a bracket E carried at the left hand side of the vehicle body, and the lower rod of the upper pair is connected at its other end to a similar bracket E' at the opposite side of the vehicle. The connection between the ends of the rods A and the bracket E may be a pivot as is shown between the other end of the rod and the link B but in order to prevent sudden shocks and also to permit movement of the wheel axle within certain limits to enable the necessary motion to take place (to allow, for example, a momentary tilting of the axle due to one wheel passing over an obstruction,) without conveying this movement to the body, a flexible or elastic joint is introduced between the end of the rod and the bracket on the body. In the arrangement shown in Fig. 1 the outer end of each rod A is passed through a slot $e$ in the bracket E or E' and carries at its end a collar A' between which and a similar collar bearing against the outside of the bracket is disposed a spring F. As the rods in this arrangement require to take both tension and compression forces, a similar spring F' is disposed between a collar $A^{20}$ on the rod and the inside of the bracket. Rubber cushions may be used instead of springs or the end of the rod may be slotted, a pin being mounted on the bracket and passed through the slot. A flexible or yielding joint may be provided at some other point in the system or the rod A may be flexible or extensible. The lower pair of transverse rods which are arranged similarly to the upper pair, and parallel with them, are pivoted to the opposite ends $b^2$ and $b^3$ of a link B' and are pivotally connected also to the brackets E and E', springs F and F' being provided as already described.

In place of the links B B' being normally vertical as shown, they may be inclined. In either case the parallelism of the rods is maintained during all movements with the above arrangement. When the body of the vehicle, from momentum in turning a corner, unequal loading, or on account of the camber of the road surface or from any other cause has a tendency to tilt or cant sidewise relatively to the wheel axle the rods will act to prevent it.

A suspension as above described may be applied to both front and rear axles or to either, or the bracket C in place of being carried on the wheel axle may be on a cross member supported by one or more longitudinal members carried by the axles.

In the arrangement shown in Figs. 3 and 4 four transverse parallel rods are employed and two brackets C $C^x$ are mounted upon the wheel axle, one at or near each side of the vehicle body which in this instance is provided with two downwardly extending brackets or horn plates E E' arranged at opposite sides of the vehicle and on opposite sides of the cross axle as shown in Fig. 4. The bracket C at the left hand side of the vehicle, as seen in the drawings has an upwardly extending lug C' and a similar lug $C^2$ extending downwardly. Two parallel rods A have one of their ends passed through openings in the lugs C' and $C^2$ springs F being arranged between collars on the ends of the rods and the bracket lugs as clearly shown in Fig. 4. In this arrangement the springs F' are not required. The opposite ends of these two rods are passed through slots in the bracket E' arranged at the opposite side of the vehicle to the bracket C. The second pair of parallel rods are similarly connected to their respective brackets E and $C^x$. The points of connection between each pair of upper and lower rods and their respective supporting brackets on the vehicle and axle are at the corners of a parallelogram and prevent or minimize tilting or canting of the body relatively to the plane of the wheel axles allowing all necessary flexibility for vertical movement of the body. The brackets C $C^x$ are preferably arranged near the opposite sides of the vehicle body but may be mounted at any convenient point intermediate of the middle point and the ends of the axle. A similar suspension employing two parallel rods A in place of four may be provided by attaching only one bracket to the vehicle body at one side and fixing on the axle at or near the opposite side of the vehicle or beyond the mid-point of the axle, a bracket having lugs to which the ends of the rods are connected. In this arrangement one of the rods is conveniently placed directly above the axle and the other rod is mounted directly below the axle. One or two sets of rods arranged in accordance with either of the arrangements may be employed as already mentioned with reference to Fig. 1.

The arrangement shown in Fig. 5 is similar to that above described, four parallel rods A being employed but only one bracket on the axle. Two transverse parallel rods A arranged above the cross axle are each pivotally connected at its outer end one to the bracket E and the other to the bracket E' on the vehicle, the meeting ends of these two rods are pivoted to an upwardly extending lug $C^2$ on a bracket $C^3$ which is mounted centrally of the axle. Two similar rods are arranged parallel with the upper rods and below the axle are pivotally connected at their outer ends to the brackets E E' and at their meeting ends are povotally connected to a downwardly extending lug C' on the bracket $C^3$. In place of a central bracket on the wheel axle and two brackets at opposite sides of the vehicle a central downwardly extending strut may be provided on the vehicle and a bracket or support mounted near each end of the axle, the points of connection between each pair of upper and lower rods and their brackets being as already described at the corners of a parallelogram.

In the above arrangements the pivots shown may be replaced by the spring connection already referred to with reference to Fig. 2, which as already described is preferred as there is little or no friction with it. In place of the springs between the ends of the rods and the brackets, a yielding may be provided by mounting the brackets upon the axle so that they can slide on it within limits and interposing springs between the ends of the brackets and collars on the axle. A substantially similar result can be produced by using three instead of four rods as above described. A convenient way of accomplishing this is illustrated in Fig. 6. Two transverse parallel rods A are pivotally connected at their outer ends to a bracket E' carried at one side of the vehicle body. The inner ends of the two rods are pivotally connected each to one end of a pair of links B B' which are pivoted or fulcrumed midway of their ends to lugs upon an axle bracket C. The other ends of the links B B' are pivoted together and to one end of a rod $A^x$ which is arranged parallel with the rods A and has its outer end pivotally connected to a bracket E at the side of the vehicle opposite to the bracket E'.

Any of the above described arrangements can be employed for preventing tilting or canting of the vehicle body longitudinally or fore and aft. A convenient arrangement is shown in Figs. 7 and 8. Two pairs of parallel rods are provided at each side of the vehicle each pair extending from one end of the vehicle to a point midway between the axles. Extending between the front and rear axles at each side of the vehicle is a tie rod or beam J carried upon the axles and having mounted upon it a bracket or support C. The vehicle body carries at each of its four corners a bracket E. Each rod has one of its ends passed through a slot in a bracket E a spring F being disposed between the bracket and the end of the rod as already described. The opposite ends of the rods are pivotally connected to their respective brackets C. The upper and lower rods of each pair at the same side of the vehicle are in line with each other.

Tilting or canting of the vehicle body both transversely and longitudinally can be prevented by arranging any two of the above constructions one being arranged to prevent transverse tilting and the other longitudinal tilting. The same result is however effected by a simpler and lighter construction as shown in Figs. 9 and 9ª. Mounted at each corner of the vehicle body is a bracket E each of which has connected to it one end of a pair of tie rods $A^{11}$ which are arranged diagonally of the vehicle. The points of connection of each pair of rods and the bracket E on the vehicle are at the corners of a parallelogram. At each side is a longitudinal member supported upon the axles and carrying a cross rod J', which supports a bracket C. Each of the rods $A^{11}$ is pivotally connected to the bracket C. With this system of suspension the vertical distance through which the body is raised consequent on a wheel passing over an obstruction can be halved by arranging the usual spring suspension between the vehicle body and the wheel axle, midway of the axle in place of close to each wheel, a single spring suspension on each axle therefore serves for both wheels and acts as a pivot when one wheel is raised, the parallel rods arranged according to this invention with reference to Figs. 1 to 8 allow of this and prevent the body canting.

With the arrangement shown in Figs. 9 and 9ª a single spring suspension can replace the four generally employed. The spring suspension will in this case be arranged between the central support C and the vehicle body and the distance through which the body would be raised vertically by the rising of a wheel, will be halved both longitudinally and transversely.

The present invention is applicable with the usual system of springing but is specially intended for use with the system of springing referred to in the specification of U. S. Letters Patent No. 814198 and applications Serial Numbers 195920 and 260572.

The expression vehicle body in the specification and claims is intended to denote the chassis and the body proper that is all that part of the vehicle between which and the wheel axles the usual spring suspensions are arranged.

What I claim and desire to secure by Letters Patent of the United States is:—

1. The combination of a vehicle body, an axle, and means connecting the axle and body to prevent tilting of the latter relative to the axle, said means including oppositely extending parallel rods extending from brackets on the body to brackets supported by the axle, each rod being movable relative to one of the brackets connected by it, and yielding means arranged between an abutment on each rod and the adjacent bracket.

2. The combination of a vehicle body, an axle, two rods pivotally connected at one end with and extending in opposite directions from a member attached to the axle, the other ends of the rods extending through openings in brackets attached to the body, and yielding means arranged between the body and an abutment on each rod, for the purpose specified.

3. The combination of a vehicle body, an axle, two rods pivotally connected at one end with and extending in opposite directions from a member attached to the axle, the other ends of the rods extending through openings in brackets attached to the body, and a coiled spring surrounding each rod and bearing against the frame bracket and an abutment at the outer end of the rod, for the purpose specified.

4. The combination of a vehicle body, an axle, two rods pivotally connected at one end with and extending in opposite directions from a member attached to the axle, the other ends of the rods extending through openings in brackets attached to the body, and coiled springs surrounding each rod and bearing against the frame bracket and two abutments arranged on the rod on opposite sides of said bracket, for the purpose specified.

5. The combination of a vehicle body, an axle, a lever mounted on a support connected with the axle to rock about a horizontal axis at an intermediate point in its length, two oppositely extending rods respectively connected at their inner ends to the arms of the lever and having their outer ends extending through brackets attached to the vehicle body, and yielding means between the vehicle body and abutments on said rods.

6. The combination of a vehicle body, an axle, brackets supported by and extending above and below the horizontal planes of the axle, brackets attached to the body, rods pivotally connected with each of said brackets supported by the axle and each extending in opposite directions therefrom through one of the brackets on the body, and yielding means arranged between an abutment on each rod and the adjacent bracket on the body.

7. The combination of a vehicle body, an axle, brackets supported by and extending above and below the horizontal planes of the axle, brackets attached to the body, a lever pivotally connected at an intermediate point in its length with each of said brackets supported by the axle, and a pair of rods connected at one end with the arms of each lever and having their other ends yieldingly connected with brackets on the body.

8. The combination of a vehicle body, an axle, brackets on the axle, brackets on the body, and a plurality of rods each connecting a bracket on the axle with a bracket on the body, the connections between the rods and brackets permitting relative movement of such parts and the rods being arranged in pairs with the members of each pair parallel and connected with brackets extending from opposite sides of the axle.

9. The combination of a vehicle body, an axle, brackets on and projecting in opposite directions from the axle, brackets on the body, and two pairs of rods extending in opposite directions from the brackets on the axle and connecting said brackets with the brackets on the body, the connection between said rods and brackets permitting relative movement of said parts and the members of each pair being arranged parallel.

In testimony whereof I have signed my name to this specification in the presence of two subscribing witnesses.

CHAS. WM. FULTON.

Witnesses:
J. MEPADZUN,
FRED MIDDLETON.